United States Patent [19]

Angevine et al.

[11] Patent Number: 4,956,075

[45] Date of Patent: Sep. 11, 1990

[54] CATALYTIC CRACKING

[75] Inventors: Philip J. Angevine, Woodbury; Robert G. Bundens, Mullica Hill; Joseph A. Herbst, Turnersville, all of N.J.; Albin Huss, Jr., Chadds Ford, Pa.; Sadi Mizrahi, Cherry Hill, N.J.

[73] Assignee: Mobil Oil Corporation, New York, N.Y.

[21] Appl. No.: 288,181

[22] Filed: Dec. 22, 1988

[51] Int. Cl.$^5$ ............................................. C10G 11/05
[52] U.S. Cl. ............................... 208/120; 208/52 CT; 208/121; 208/149; 502/65; 502/67; 502/79
[58] Field of Search ............... 208/113, 120, 52 CT, 208/121, 122, 149; 502/521, 65, 67, 79

[56] References Cited

U.S. PATENT DOCUMENTS

| | | | |
|---|---|---|---|
| 3,501,395 | 3/1970 | Miale | 208/121 |
| 3,575,848 | 4/1971 | Miale | 208/121 |
| 4,083,807 | 4/1978 | McKinney | 208/120 |
| 4,097,410 | 6/1978 | Gladrow | 502/65 |
| 4,169,784 | 10/1979 | Nielsen et al. | 208/52 CT |
| 4,198,287 | 4/1980 | Hemler et al. | 208/113 |
| 4,310,410 | 1/1982 | McKay | 208/120 |

OTHER PUBLICATIONS

C&EN, Mar. 21, 1988, "New Family of Molecular Sieves Developed".
American Chemical Society, ACS Symposium Series 222, "Heterogeneous Catalysis", pp. 254-271.

Primary Examiner—Anthony McFarlane
Attorney, Agent, or Firm—Alexander J. McKillop; Charles J. Speciale; Marina V. Schneller

[57] ABSTRACT

The use of a catalyst containing Mn, a large pore crystalline molecular sieve, and optionally rare earths in catalytic cracking is disclosed. This catalyst gives high gasoline selectivity with low coke yields and is suitable for either gas oil or resid cracking applications.

36 Claims, No Drawings

CATALYTIC CRACKING

FIELD OF THE INVENTION

The present invention provides a process for catalytically cracking a hydrocarbon feed to a product comprising gasoline in the presence of a cracking catalyst under catalytic cracking conditions. The process provides higher gasoline yield than existing processes employing, for example, REY, RE-USY or USY catalysts. Additional benefits of the present invention may include lower $C_3-$ or coke yield and higher gasoline octane. In the process of the invention a cracking catalyst containing a large pore crystalline molecular sieve in combination with manganese alone or manganese and rare earths is employed. The lower $C_3-$ and coke yields of the catalyst would allow the refiner to process higher end point feeds or increase unit severity e.g., by increasing catalyst circulation and/or reactor temperature.

Catalytic cracking units which are amenable to the process of the invention operate at temperatures from 400° F. (205° C.) to 1600° F. (871° C.), and under reduced, atmospheric or superatmospheric pressure. The catalytic process can be either fixed bed, moving bed or fluidized bed and the hydrocarbon flow may be either concurrent or countercurrent to the catalyst flow. The process of the invention is particularly applicable to fluid catalytic cracking.

BACKGROUND OF THE INVENTION

The present invention provides a process for catalytically cracking a hydrocarbon feed to a product comprising gasoline in the presence of a cracking catalyst under catalytic cracking conditions. Catalytic cracking units which are amenable to the process of the invention operate at temperatures from 400° F. to 1600° F. and under reduced, atmospheric or superatmospheric pressure. The catalytic process can be either fixed-bed, moving-bed or fluidized-bed and the hydrocarbon flow may be either concurrent or countercurrent to the catalyst flow. The process of the invention is particularly applicable to fluid catalytic cracking.

In fluidized catalytic cracking processes, a relatively heavy hydrocarbon feedstock, e.g., a gas oil, admixed with a suitable cracking catalyst to provide a fluidized suspension, is cracked in an elongated reactor, or riser, at elevated temperatures to provide a mixture of lighter hydrocarbon products. The gaseous reaction products and spent catalyst are discharged from the riser into a separator, e.g., a cyclone unit, located within the upper section of an enclosed stripping vessel, or stripper, with the reaction products being conveyed to a product recovery zone and the spent catalyst entering a dense catalyst bed within the lower section of the stripper. In order to remove entrained hydrocarbon product from the spent catalyst prior to conveying the latter to a catalyst regenerator unit, an inert stripping gas, e.g., steam, is passed through the catalyst where it desorbs such hydrocarbons conveying them to the product recovery zone. The fluidizable catalyst is continuously circulated between the riser and the regenerator and serves to transfer heat from the latter to the former thereby supplying the thermal needs of the cracking reaction which is endothermic.

Gas from the FCC main-column overhead receiver is compressed and directed with primary-absorber bottoms and stripper overhead gas through a cooler to the high-pressure receiver. Gas from this receiver is routed to the primary absorber, where it is contacted by the unstabilized gasoline from the main-column overhead receiver. The net effect of this contacting is a separation between $C_3+$ and $C_2-$ fractions on the feed to the primary absorber. Primary-absorber off gas is directed to a secondary or sponge absorber, where a circulating stream of light-cycle oil from the main column is used to absorb most of the remaining $C_5+$ material in the sponge absorber feed. Some $C_3$ and $C_4$ material is also absorbed. The sponge-absorber rich oil is returned to the FCC main column. The sponge-absorber overhead, with most of the valuable $C_5+$ material removed but including $H_2S$, is sent to fuel-gas or other processing.

Liquid from the high-pressure separator is sent to a stripper, where most of the $C_2-$ is removed overhead and sent back to the high pressure separator. The bottoms liquid from the stripper is sent to the debutanizer, where an olefinic $C_3-C_4$ product is separated for further gasoline production. The debutanizer bottoms, the stabilized gasoline, is sent to treating, if necessary, and then to storage.

Some catalytic cracking systems in current operation employ large pore crystalline silicate zeolite cracking catalysts in preference to the earlier used amorphous silica-alumina cracking catalysts. These zeolite cracking catalysts, containing, for example, zeolites X or Y, are generally regarded as low coke producing catalysts compared to their predecessors.

The operating conditions in the major components of catalytic cracking units are highly interdependent. Coke production is a key factor in the interdependence of the catalytic cracking conditions. To illustrate this point reference is made to G. D. Hobson et al, MODERN PETROLEUM TECHNOLOGY, Applied Science, p. 305–308 (1973), which indicates that after considerable experience, it was realized by the petroleum industry that the system was self-compensating: "the system was self-compensating with regard to heat balance over a wide range of process-operating variables such as feed rate, recycle rate, feed temperature and reactor temperature. This occurs because of the effect of catalyst/oil ratio on conversion, the effect of conversion on the coke yield and the method of reactor temperature control. A rise in feed temperature, for example, will change the heat balance of the reactor so that the reactor temperature tends to rise. As a result, the temperature controller will reduce the catalyst flow from the regenerator, which reduces the catalyst/oil ratio. The effect of this is to reduce the conversion which in turn reduces the yield of coke and thus the heat release in the regenerator. The unit readjusts itself to remain in heat balance at a slightly lower conversion, which can then be restored to its previous value by a slight rise in reactor temperature." The author, G. D. Hobson, explained by way of example: When an increase in the feed temperature occurs a rise of reactor temperature to maintain conversion is required and with a drop of catalyst circulation; the regenerator/reactor temperature differential has increased and the coke yield dropped, which is an important factor in units where coke-burning capacity is a limiting factor. More feed can then be processed to give the same weight of coke production per hour. The reduction in coke yield is due partly to the fact that at a given conversion the coke yield tends to fall as the temperature increases, and partly to the lower catalyst circulation rate which reduces the quantity of entrained hydrocarbon vapours entering the regenerator with the catalyst and, hence, results in less hydrocarbon being burnt.

SUMMARY OF THE INVENTION

In accordance with the invention, hydrocarbons with boiling points of 400° F.+ are processed under conditions of catalytic cracking in which the catalyst comprises a large pore crystalline molecular sieve and 0.1 to 10.0 weight percent manganese based on the total weight of the catalyst. The catalyst may additionally contain 0.1 to 10.0 weight percent rare earths. The sodium content of the catalyst of the present invention is less than 0.50 weight percent, preferably it is less than 0.2 weight percent and most preferably it is less than 0.15 weight percent. Amounts in excess of this range are undesireable because sodium adversely affects the hydrothermal stability and catalytic activity of cracking catalysts. The process provides higher gasoline yield than existing processes employing, for example, REY, RE-USY or USY catalysts. Additional benefits of the present invention may include lower $C_3-$ or coke yield and higher octane. In the process of the invention, a cracking catalyst containing a large pore crystalline molecular sieve in combination with manganese alone or manganese and rare earths is employed. The lower $C_3-$ and coke yields of the catalyst would allow the refiner to process higher end-point feeds or increase unit severity, e.g., by increasing catalyst circulation and/or reactor temperature.

The process of the invention exhibits higher gasoline yield with reduced yields of $C_3$ minus product and coke compared to rare earth stabilized faujasite catalysts.

The reduced yields of the process for $C_3$ minus and coke products allows the refiner to process higher end point feeds or increase unit severity e.g. by increasing catalyst circulation and/or reactor temperature.

DESCRIPTION OF THE INVENTION

Feeds

Hydrocarbon stocks suitable as feeds comprise petroleum fractions having an initial boiling point above 400° F., a 50% point range of at least 500° F. and an end point range of at least 600° F. Such hydrocarbon fractions include gas oils (including vacuum gas oils), thermal oils, residual oils, cycle stocks, whole top crudes, tar sand oils, shale oils, synthetic fuels, heavy hydrocarbon fractions derived from the destructive hydrogenation of coal, tar, pitches, asphalts, hydrotreated feedstocks derived from any of the foregoing, and the like. As will be recognized, the distillation of higher boiling petroleum fractions above about 750° F. must be carried out under vacuum in order to avoid thermal cracking. The boiling temperatures utilized herein are expressed in terms of convenience of the boiling point corrected to atmospheric pressure.

Catalyst

In the catalytic cracking process of the invention, the catalyst composition comprises a large pore crystalline molecular sieve and manganese in an amount ranging from 0.1 to 10 weight percent, based on the total weight of the catalyst. Preferably, the manganese content of the catalyst ranges from 0.1 to 3.0 weight percent and most preferably from 0.1 to 1.0 weight percent based on the total weight of the catalyst.

In other embodiments, the large pore crystalline molecular sieve catalyst contains in addition to manganese, rare earths. With respect to these embodiments, increased gasoline octane is obtained if catalysts are prepared by partial rare earth addition followed by manganese addition over the octane of gasoline produced by compositions where the rare earth addition follows the manganese addition or where the catalyst is subjected to co-addition of rare earth and manganese from the same solution. In these embodiments, the catalyst composition comprises a large pore crystalline molecular sieve and manganese in an amount ranging from 0.1 to 10 weight percent, based on the total weight of the catalyst. Preferably, the manganese content of the catalyst ranges from 0.1 to 3.0 weight percent and most preferably from 0.1 to 1.0 weight percent based on the total weight of the catalyst. The rare earth content ranges from 0.1 to 10 weight percent, preferably from 0.1 to 4 weight percent and most preferably from 0.5 to 1.0 weight percent. Representative large pore crystalline molecular sieves used in accordance with the invention include zeolite X, zeolite Y, dealuminated Y zeolite, e.g., USY, dealuminated silicon enriched zeolites, e.g., LZ-210, as well as zeolite ZK-5, zeolite ZK-4, zeolite omega, zeolite Beta, ZSM-20, zeolite L and also naturally occurring zeolites such as faujasite, mordenite and the like, merely to name a few.

Other large pore crystalline molecular sieves include pillared silicates and/or clays; aluminophosphates, e.g., ALPO-5, VPI-5; silicoaluminophosphates, e.g., SAPO-5, SAPO-37, SAPO-31, SAPO-40, SAPO-41; and other metal aluminophosphates. These are variously described in U.S. Pat. Nos. 4,440,871; 4,554,143; 4,567,029; 4,666,875 and 4,742,033.

The manganese or rare earth component of the catalyst composition can be ion exchanged, impregnated, deposited or admixed into the catalyst composition.

Typical techniques would include contacting the catalyst composition with the desired replacing manganese or rare earth salt or salt solution. Although a wide variety of salts can be employed, particular preference is given to chlorides, nitrates and sulfates.

For example, representative ion exchange techniques are disclosed in a wide variety of patents including U.S. Pat. Nos. 3,140,249; 3,140,251; and 3,140,253.

Typically, following contact with the salt solution the large pore crystalline molecular sieve for use herein is then preferably washed with water and dried at a temperature ranging from 150° F. to about 600° F. and, thereafter, may be calcined.

The preparation of some molecular sieve - containing catalysts may require reduction of the sodium content, as well as conversion to its acid (protonated) form. For example, with zeolites this can be accomplished by employing the procedures of converting the zeolite to an intermediate ammonium form as a result of ammonium ion exchange followed by calcination to provide the hydrogen form. The operational requirements of these procedures are well known in the art.

The source of the ammonium ion is not critical; thus the source can be ammonium hydroxide or an ammonium salt such as ammonium nitrate, ammonium sulfate, ammonium chloride and mixtures thereof. These reagents are usually in aqueous solutions; by way of illustration, aqueous solutions of 1N NH$_4$OH, 1N NH$_4$NO$_3$, 1N NH$_4$Cl and 1N NH$_4$Cl/NH$_4$OH have been used to effect ammonium ion exchange. The pH of the ion exchange is not critical but is generally maintained at 7 to 12. Ammonium exchange may be conducted for a period of time ranging from about 0.5 to about 20 hours at a temperature ranging from ambient up to about 212° F. The ion exchange may be conducted in a single stage or in multiple stages. Calcination of the ammonium exchanged zeolite will produce the crystalline silicate or zeolite in its acid form. Calcination can be effected at temperatures up to about 1200° F.

In the case of catalytic cracking catalysts, it is desired to incorporate the large pore crystalline molecular sieve with selected matrix materials resistant to the temperatures and other conditions employed in catalytic cracking processes. Such matrix materials may include active and inactive materials and synthetic or naturally occurring zeolites as well as inorganic materials such as clays, silica and/or metal oxides, e.g. alumina. These may be either naturally occurring or in the form of gelatinous precipitates, sols or gels including mixtures of silica and metal oxides. Use of a material in conjunction with the zeolite, i.e. combined therewith, which is active, may enhance the conversion and/or selectivity of the catalyst in certain organic conversion processes. Inactive materials suitably serve as diluents to control the amount of conversion in a given process so that products can be obtained ecomonically and orderly without employing other means for controlling the rate of reaction. Frequently, crystalline molecular sieve materials have been incorporated into naturally occurring clays, e.g. bentonite and kaolin. These materials, i.e. clays, oxides, etc., function, in part, as binders for the catalyst. It is desirable to provide a catalyst having good physical strength, because in catalytic cracking processes, the catalyst is often subjected to conditions, which tend to break the catalyst down into smaller particles which cause problems in processing.

Naturally occurring clays which can be composited with the hereby synthesized zeolite include the montmorillonite and kaolin families which include the sub bentonites, and the kaolins commonly known as Dixie, McNamee, Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the large pore crystalline molecular sieve hereby synthesized can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of these components could also be used.

The relative proportions of finely divided crystalline silicate and inorganic oxide gel matrix vary widely with the crystalline silicate content ranging from about 0.1 to about 90 percent by weight, and more usually in the range of about 10 to about 70 percent by weight of the composite.

A shape selective medium pore crystalline silicate zeolite catalyst can constitute an optional catalyst component of a mixed catalyst system of the invention. Representative of medium pore zeolites include ZSM-5, ZSM-11, ZSM-12, ZSM-23, ZSM-35, ZSM-48, ZSM-57 and other similar materials. U.S. Pat. No. 3,702,886 describing and claiming ZSM-5 is incorporated herein by reference. Also, U.S. Reissue Pat. No. 29,948 describing and claiming a crystalline material with an X-ray diffraction pattern of ZSM-5 is incorporated herein by reference as is U.S. Pat. No. 4,061,724 describing a high silica ZSM-5 referred to as "silicalite" therein.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

ZSM-23 is more particularly described in U.S. Pat. No. 4,076,842, the entire contents of which are incorporated herein by reference.

ZSM-35 is more particularly described in U.S. Pat. No. 4,016,245, the entire contents of which are incorporated herein by reference.

The preferred shape selective crystalline silicate zeolites of the catalyst composition herein are ZSM-5, ZSM-11, ZSM-12, ZSM-23, ZSM-35, ZSM-48 and ZSM-57 with ZSM-5 being particularly preferred.

In addition, the catalyst composition may include metals useful in promoting the oxidation of carbon monoxide to carbon dioxide under regenerator conditions as described in U.S. Pat. No. 4,350,614.

Process

The present invention provides a process for catalytically cracking a hydrocarbon feed to a product comprising gasoline in the presence of a cracking catalyst under catalytic cracking conditions. Catalytic cracking units which are amenable to the process of the invention operate at temperatures from 400° F. to 1600° F. and under reduced, atmospheric or superatmospheric pressure. The catalytic process can be either fixed-bed, moving-bed or fluidized-bed and the hydrocarbon flow may be either concurrent or countercurrent to the catalyst flow. The process of the invention is particularly applicable to fluid catalytic cracking.

In fluidized catalytic cracking processes, a relatively heavy hydrocarbon feedstock, e.g., a gas oil, admixed with a suitable cracking catalyst to provide a fluidized suspension, is cracked in an elongated reactor, or riser, at elevated temperatures to provide a mixture of lighter hydrocarbon products. The gaseous reaction products and spent catalyst are discharged from the riser into a separator, e.g., a cyclone unit, located within the upper section of an enclosed stripping vessel, or stripper, with the reaction products being conveyed to a product recovery zone and the spent catalyst entering a dense catalyst bed within the lower section of the stripper. In order to remove entrained hydrocarbon product from the spent catalyst prior to conveying the latter to a catalyst regenerator unit, an inert stripping gas, e.g., steam, is passed through the catalyst where it desorbs such hydrocarbons conveying them to the product recovery zone. The fluidizable catalyst is continuously circulated between the riser and the regenerator and serves to transfer heat from the latter to the former thereby supplying the thermal needs of the cracking reaction which is endothermic.

Gas from the FCC main-column overhead receiver is compressed and directed with primary-absorber bottoms and stripper overhead gas through a cooler to the high-pressure receiver. Gas from this receiver is routed to the primary absorber, where it is contacted by the unstabilized gasoline from the main-column overhead receiver. The net effect of this contacting is a separation between $C_3+$ and $C_2-$ fractions on the feed to the primary absorber. Primary-absorber off gas is directed to a secondary or sponge absorber, where a circulating stream of light-cycle oil from the main column is used to absorb most of the remaining C5+ material in the sponge absorber feed. Some C3 and C4 material is also absorbed. The sponge-absorber rich oil is returned to the FCC main column. The sponge-absorber overhead, with most of the valuable C4+ material removed but including H2S, is sent to fuel-gas or other processing.

Liquid from the high-pressure separator is sent to a stripper, where most of the C2− is removed overhead and sent back to the high pressure separator. The bottoms liquid from the stripper is sent to the debutanizer, where an olefinic C3-C4 product is separated for further gasoline production. The debutanizer bottoms, the stabilized gasoline, is sent to treating, if necessary, and then to storage.

The C3 and C4 product olefins can be directed to alkylation units to produce a high octane gasoline by the addition of an iso-paraffin (usually iso-butane) to one or more of the low molecular olefins (usually propylene and butylene). The following examples illustrate the invention:

EXAMPLE 1

The catalyst of this example was laboratory prepared and contains 20 wt % of commercial USY (Z-14US) in a SiO2-Al2O3-kaolin clay (60.45/4.55/35 wt/wt/wt) matrix. The catalyst was NH4NO3 exchanged following spray drying to remove Na.

EXAMPLE 2

A portion of the catalyst from Example 1 was contacted with a rare earth chloride solution (0.75 wt % RECl3.6H2O prepared by diluting Rare Earth Chloride, Code 1443, manufactured by Davison Specialty Chemical Co., with deionized water), then washed Cl− free and dried at 250° F. for at least 16 hrs.

EXAMPLE 3

A portion of the catalyst from Example 1 was contacted with a 1.0N MnSO4 solution, then washed SO4= free and dried at 250° F. for at least 16 hrs.

EXAMPLES 4-6

The catalysts of Examples 4-6 were prepared by laboratory steam treating the USY, RE-USY and Mn-USY catalysts of Examples 1-3, respectively, for 10 hrs at 1450° F. with a steam/air (45/55) mixture at 0 psig in a fluidized-bed steaming apparatus.

EXAMPLES 7-9

The catalysts of Examples 7-9 are commercial USY, RE-USY and REY catalysts, respectively, which were steam treated at the identical conditions as noted in Examples 4-6.

The catalysts of Examples 4-9 were each catalytically evaluated in a fixed-fluidized bed unit at 960° F. temperature and 1.0 minute on-stream using Joliet Sour Heavy Gas Oil (JSHGO) as feed. The JSHGO feed utilized in these evaluations has the properties shown in Table 1. The cat/oil ratio was varied from 2.0-5.0 with a corresponding WHSV range of 30-12 hr−1 to cover a wide range of conversions.

The product and potential alkylate yields/octane numbers at 70 vol % conversion for the Mn-USY, RE-USY and USY lab catalysts (Examples 4-6) are compared in Table 2. A comparison of the Mn-USY lab catalyst (Example 6) with the commercial USY, RE-USY and REY catalysts (Examples 7-9) is shown in Table 3. The results show that the Mn containing USY catalyst yields significantly more gasoline than the comparably steamed laboratory or commercial USY, RE-USY or REY catalysts. Compared with the USY catalysts, the Mn-USY catalyst yielded 3-4 vol % more gasoline, comparable or lower coke and reduced C3− and C3 olefin+C4 olefin yields. Compared with the commercial RE-USY catalyst the Mn-USY catalyst gave increased gasoline, lower C3-and C3 olefin+C4 olefins yields and about a 25% reduction in coke. While the higher gasoline yield of the Mn-USY catalyst is accompanied by a 2-2.5 lower RON+O gasoline compared with the USY or RE-USY catalysts, the Mn-USY catalyst yielded comparable octane to the commercial REY catalyst while still showing significantly higher gasoline and lower coke yields.

When compared on a constant coke basis (Tables 4 and 5), the low coke selectivity of the Mn-USY catalyst translates into higher conversion compared with either the RE-USY or REY catalysts. As a result, the gasoline yield advantage of the Mn-USY catalyst is further enhanced and C3 olefin+C4 olefins are increased relative to REY. These olefins can be recovered as high value liquid products either by alkylation or by alternative olefin upgrading technologies. Note that while these constant coke yields were obtained by varying cat/oil, an alternative approach would be to vary reactor temperature. If the cracking unit is not compressor limited, this would result in higher temperature operation for the Mn-USY catalyst relative to either REY or RE-USY catalysts. This should yield gasoline octanes for the Mn-USY catalysts which are greater than those for REY and which compare more favorably with those of RE-USY.

TABLE 1

| Properties of Joliet Sour Heavy Gas Oil (JSHGO) | |
|---|---|
| Gravity, API | 24.3 |
| Aniline Pt., °F. | 177 |
| Hydrogen, wt. % | 12.3 |
| Sulfur, wt. % | 1.87 |
| Nitrogen, wt. % | 0.10 |
| Basic Nitrogen, ppm | 327 |
| Conradson Carbon, wt % | 0.28 |
| Kinematic Viscosity at 210° F. | 3.6 |
| Bromine No. | 4.2 |
| R.I. at 70° F. | 1.5080 |
| Molecular Weight | 358 |
| Pour Point, °F. | 85 |
| Paraffins, wt. % | 85 |
| Naphthenes, wt. % | 32.0 |
| Aromatics, wt. % | 44.5 |
| Aromatic Carbon, wt. % | 18.9 |
| Ni, ppm | 0.3 |
| V, ppm | 0.6 |

TABLE 2

Comparison of Mn-USY, USY and RE-USY Lab Catalysts At 70 Vol 3Conversion of JSHGO

| Example | Mn-USY 6 | USY 4 | RE-USY 5 |
|---|---|---|---|
| Conversion, % vol. | 70 | 70 | 70 |
| Product Yields: | | | |
| C5+ Gasoline, % vol. | 57.0 | 51.6 | 53.7 |
| Total, C4's, % vol. | 15.2 | 17.4 | 16.8 |
| C3−, % wt. | 7.7 | 9.8 | 8.4 |
| Coke, % wt. | 3.1 | 3.7 | 3.9 |
| H2, % wt. | 0.05 | 0.08 | 0.08 |
| LFO, % wt. | 27.2 | 27.5 | 26.8 |
| HFO, % wt. | 5.4 | 5.3 | 6.0 |
| G + D, % wt. | 74.0 | 70.0 | 71.1 |
| n-C4, % vol. | 1.4 | 1.5 | 1.3 |

TABLE 2-continued

Comparison of Mn-USY, USY and RE-USY Lab Catalysts At 70 Vol %Conversion of JSHGO

| Example 6 | Mn-USY 4 | USY 5 | RE-USY |
|---|---|---|---|
| i-C$_4$, % vol. | 6.9 | 8.2 | 7.4 |
| C$_4$=, % vol. | 6.9 | 7.7 | 8.1 |
| C$_3$, % vol. | 2.2 | 2.8 | 2.0 |
| C$_3$=, % vol. | 7.2 | 9.5 | 8.5 |
| Potential Alkylate Yields: | | | |
| Alkylate, % vol. | 23.5 | 28.6 | 27.5 |
| C$_5$+ Gasoline + Alkylate, % vol. | 80.5 | 80.2 | 81.2 |
| Outside i-C$_4$, % vol. | 9.1 | 11.4 | 11.3 |
| Octane Number, RON + O: | | | |
| C$_5$+ Gasoline | 88.0 | 89.9 | 89.1 |
| C$_5$+ Gasoline + Potential Alkylate | 89.5 | 91.3 | 90.7 |

TABLE 3

Comparison of Mn-USY Lab Catalyst With Commercial USY, RE-USY and REY Catalysts at 70 Vol % Conversion of JSHGO

| | Lab | Commercial | | |
|---|---|---|---|---|
| Example Number | Mn-USY 6 | USY 7 | RE-USY 8 | REY 9 |
| Conversion, % vol. | 70 | 70 | 70 | 70 |
| Product Yields: | | | | |
| C$_5$+ Gasoline, % vol. | 57.0 | 54.4 | 53.7 | 54.9 |
| Total, C$_4$'s, % vol. | 15.2 | 17.2 | 16.9 | 15.8 |
| C$_3$−, % wt. | 7.7 | 8.4 | 8.7 | 7.9 |
| Coke, % wt. | 3.1 | 3.2 | 4.1 | 4.3 |
| H$_2$, % wt. | 0.05 | 0.07 | 0.13 | 0.09 |
| LFO, % wt. | 27.2 | 26.6 | 27.0 | 25.8 |
| HFO, % wt. | 5.4 | 6.3 | 5.9 | 7.0 |
| G + D, % wt. | 74.0 | 71.1 | 70.6 | 70.7 |
| n-C$_4$, % vol. | 1.4 | 1.4 | 1.7 | 1.6 |
| i-C$_4$, % vol. | 6.9 | 8.3 | 7.5 | 7.6 |
| C$_4$=, % vol. | 6.9 | 7.5 | 7.7 | 6.6 |
| C$_3$, % vol. | 2.2 | 2.4 | 2.2 | 2.6 |
| C$_3$=, % vol. | 7.2 | 8.1 | 8.2 | 6.9 |
| Potential Alkylate Yields: | | | | |
| Alkylate, % vol. | 23.5 | 26.0 | 26.5 | 22.4 |
| C$_5$+ Gasoline + Alkylate, % vol. | 80.5 | 80.4 | 80.2 | 77.3 |
| Outside i-C$_4$, % vol. | 9.1 | 9.4 | 10.5 | 7.6 |
| Octane Number, RON + O: | | | | |
| C$_5$+ Gasoline | 88.0 | 90.0 | 90.4 | 87.3 |
| C$_5$+ Gasoline+ Potential Alkylate | 89.5 | 91.3 | 91.6 | 89.2 |

TABLE 4

Comparison of Mn-USY, USY and RE-USY Lab Catalysts Adjusted to 3.0 wt % Coke Yield

| Example Number | Mn-USY 6 | USY 4 | RE-USY 5 |
|---|---|---|---|
| Conversion, % vol. | 70.5 | 65.7 | 66.5 |
| Product Yields: | | | |
| C$_5$+ Gasoline, % vol. | 57.2 | 50.6 | 53.4 |
| Total, C$_4$'s, % vol. | 15.4 | 15.5 | 15.1 |
| C$_3$−, % wt. | 7.9 | 8.5 | 7.6 |
| Coke, % wt. | 3.0 | 3.0 | 3.0 |
| H$_2$, % wt. | 0.05 | 0.07 | 0.05 |
| LFO, % wt. | 26.9 | 29.9 | 28.7 |
| HFO, % wt. | 5.2 | 7.0 | 7.3 |
| G + D, % wt. | 73.9 | 71.7 | 72.7 |
| n-C$_4$, % vol. | 1.4 | 1.2 | 1.2 |
| i-C$_4$, % vol. | 7.1 | 6.7 | 6.5 |
| C$_4$=, % vol. | 6.8 | 7.6 | 7.6 |
| C$_3$, % vol. | 2.3 | 2.2 | 1.8 |
| C$_3$=, % vol. | 7.3 | 8.4 | 7.7 |
| Potential Alkylate Yields: | | | |
| Alkylate, % vol. | 23.5 | 26.3 | 25.0 |
| C$_5$+ Gasoline + Alkylate, % vol. | 80.7 | 76.9 | 78.4 |
| Outside i-C$_4$, % vol. | 8.9 | 11.9 | 10.8 |

TABLE 4-continued

Comparison of Mn-USY, USY and RE-USY Lab Catalysts Adjusted to 3.0 wt % Coke Yield

| Example Number | Mn-USY 6 | USY 4 | RE-USY 5 |
|---|---|---|---|
| Octane Number, RON + O: | | | |
| C$_5$+ Gasoline | 88.0 | 90.0 | 89.1 |
| C$_5$+ Gasoline + Potential Alkylate | 89.5 | 91.4 | 90.7 |

TABLE 5

Comparison of Mn-USY Lab Catalyst With Commercial USY, RE-USY And REY Catalysts Adjusted to 3.0 wt % Coke Yield

| | Lab | Commercial | | |
|---|---|---|---|---|
| Example Number | Mn-USY 6 | USY 7 | RE-USY 8 | REY 9 |
| Conversion, % vol. | 70.5 | 68.6 | 65.8 | 62.6 |
| Product Yields: | | | | |
| C$_5$+ Gasoline, % vol. | 57.2 | 53.8 | 52.6 | 51.7 |
| Total, C$_4$'s, % vol. | 15.4 | 16.6 | 14.7 | 13.1 |
| C$_3$−, % wt. | 7.9 | 8.0 | 7.4 | 6.4 |
| Coke, % wt. | 3.0 | 3.0 | 3.0 | 3.0 |
| H$_2$, % wt. | 0.05 | 0.07 | 0.11 | 0.07 |
| LFO, % wt. | 26.9 | 27.7 | 29.5 | 29.9 |
| HFO, % wt. | 5.2 | 6.6 | 7.3 | 9.9 |
| G + D, % wt. | 73.9 | 71.8 | 72.5 | 72.4 |
| n-C$_4$, % vol. | 1.4 | 1.3 | 1.4 | 1.2 |
| i-C$_4$, % vol. | 7.1 | 7.8 | 6.0 | 5.9 |
| C$_4$=, % vol. | 6.8 | 7.4 | 7.3 | 5.9 |
| C$_3$, % vol. | 2.3 | 2.1 | 1.7 | 1.7 |
| C$_3$=, % vol. | 7.3 | 7.9 | 7.3 | 5.9 |
| Potential Alkylate Yields: | | | | |
| Alkylate, % vol. | 23.5 | 25.5 | 24.4 | 19.7 |
| C$_5$+ Gasoline + Alkylate, % vol. | 80.7 | 79.3 | 77.0 | 71.4 |
| Outside i-C$_4$, % vol. | 8.9 | 9.6 | 10.6 | 7.5 |
| Octane Number, RON + O: | | | | |
| C$_5$+ Gasoline | 88.0 | 89.9 | 90.0 | 86.2 |
| C$_5$+ Gasoline + Potential Alkylate | 89.5 | 91.2 | 91.3 | 88.4 |

EXAMPLE 10

The as-received commercial USY catalyst of Example 7 was contacted with 1.65 wt % MnSO$_4$ solution, washed SO$_4$= free and dried at 250° F. for at least 16 hours. The catalyst was then contacted with a rare earth chloride solution prepared as described in Example 2, washed Cl− free and dried at 250° F. for at least 16 hours. The composition of the catalyst is shown in Table 6.

EXAMPLE 11

The as-received commercial USY catalyst of Example 7 was contacted with a rare earth chloride solution prepared as described in Example 2, washed Cl− free and dried at 250° F. for at least 16 hours. The catalyst was then contacted with a 1.65 wt % MnSO$_4$ solution, washed SO$_4$= free, and dried at 250° F. for at least 16 hours. The composition of the catalyst is shown in Table 6.

EXAMPLE 12

The as-received commercial catalyst of Example 7 was contacted with a solution prepared by mixing 1400 cc of the rare earth chloride solution prepared as in Example 2, with 600 cc of a 1.65 wt % MnSO$_4$ solution, washed SO$_4$= and Cl− free and dried for at least 16 hours at 250° F. The composition of the catalyst is shown in Table 6.

EXAMPLES 13-15

The catalysts of Examples 10-12 were steam treated for 10 hours at 1450° F. with a steam/air (45/55) mixture at 0 psig in a fluidized-bed steaming apparatus. The resulting catalysts are designated as the catalysts of Examples 13, 14, and 15, respectively.

The catalysts of Examples 13-15 were each catalytically tested in a fixed-fluidized bed unit at 960° F. temperature and 1.0 minute on-stream using Joliet Sour Heavy Gas Oil. The catalyst to oil ratio was varied from 2 to 5 with a corresponding WHSV range of 30-12 $hr^{-1}$ to cover a wide range of conversions.

TABLE 6

| Compositions of Catalysts Containing Manganese and Rare Earths | | | |
|---|---|---|---|
| Catalyst of | Example 10 | Example 11 | Example 12 |
| Manganese, wt % | 0.23 | 0.33 | 0.22 |
| Rare Earths, wt % | | | |
| Samarium | 0.014 | 0.012 | 0.012 |
| Neodymium | 0.180 | 0.171 | 0.153 |
| Praseodymium | 0.171 | 0.165 | 0.165 |
| Cerium | 0.294 | 0.288 | 0.258 |
| Lanthanum | 0.264 | 0.246 | 0.222 |
| Total | 0.92 | 0.88 | 0.80 |

The product yields and octanes at 70% conversion are shown in Table 7.

TABLE 7

| | Comparison of RE and Mn-Containing USY Catalysts, Effect of Order of Addition of Mn and RE | | |
|---|---|---|---|
| | 1. Mn Add. 2. RE Add. | 1. RE Add. 2. Mn Add. | Co-Addition of Mn and RE |
| Example Number | 13 | 14 | 15 |
| Conversion, vol % | 70 | 70 | 70 |
| Product Yields | | | |
| $C_5+$ Gasoline, % vol | 55.7 | 55.7 | 56.3 |
| Total, $C_4$'s, % vol | 17 | 16 | 15.6 |
| $C_3^-$, % wt | 7.2 | 8.0 | 7.7 |
| Coke, % wt | 3.0 | 2.9 | 3.0 |
| $H_2$, % wt | 0.08 | 0.08 | 0.0 |
| LFO, % wt | 26.7 | 26.5 | 26.6 |
| HFO, % wt | 6.3 | 6.5 | 6.3 |
| n-$C_4$, % vol | 1.4 | 1.3 | 1.1 |
| i-$C_4$, % vol | 8.0 | 7.6 | 7.3 |
| $C_4^=$, % vol | 7.6 | 7.0 | 7.1 |
| $C_{3=}$, % vol | 2.1 | 2.4 | 2.2 |
| $C_3$, % vol | 6.7 | 7.4 | 7.2 |
| Potential Alkylate Yields | | | |
| Alkylate, % vol | 23.9 | 24.0 | 23.9 |
| $C_5+$ Gasoline + | | | |
| Alkylate, % vol | 79.6 | 79.7 | 79.9 |
| Outside i-$C_4$, % vol | 8.3 | 8.7 | 9.0 |
| Octane No., RON + O | | | |
| $C_5+$ Gasoline | 88.9 | 90.0 | 88.9 |
| $C_5+$ Gasoline + | | | |
| Potential Alkylate | 90.5 | 91.2 | 90.4 |

Comparison of these results with those obtained for the base commercial USY catalyst (Example 7 in Table 3) shows that the catalyst prepared by RE addition followed by Mn addition gave as high an octane number as the base commercial USY catalyst with a 1.3 vol % higher gasoline yield. The data in Table 7 also show that the order of Mn and RE addition is important. The catalyst prepared by Mn addition following RE addition (Example 14) gave a higher octane gasoline than the catalysts made by RE addition following Mn addition (Example 13) or co-addition of RE and Mn (Example 15).

What is claimed is:

1. In a catalytic cracking process, undertaken in the presence of a cracking catalyst free of manganese, in a catalytic cracking zone, to upgrade a heavy hydrocarbon feedstock to produce gasoline, during which upgrade, coke formation on the catalyst occurs, wherein the catalyst containing said coke during cracking is conveyed to a regenerator for regeneration and, after regeneration, is reduced in coke content and is conveyed to said zone, the improvement comprising passing through said zone a heavy hydrocarbon feed,
    subjecting the feed to catalytic cracking conditions by passing to said zone a catalyst composition consisting essentially of manganese ultrastable Y and a matrix component, wherein the manganese content ranges from 0.1 to 10 weight percent of the catalyst composition with a Na content which is less than 0.5 weight percent, wherein catalytic cracking conditions include a temperature of about 850° F. to about 1500° F., a catalyst to feed ratio of 1:1 to about 50:1; and
    recovering upgraded effluent with gasoline yields greater than that of the cracking catalyst free of manganese.

2. The process of claim 1, wherein at least a portion of said manganese is exchanged onto the catalyst composition.

3. The process of claim 1, wherein at least part of said manganese is deposited onto the catalyst composition.

4. The process of claim 1, wherein said catalyst composition is ammonium ion exchanged and then calcined.

5. The process of claim 1, wherein the composite catalyst composition comprises 1 to 99 weight percent of a matrix.

6. The process of claim 1, wherein the catalytic cracking process is undertaken in the absence of added hydrogen.

7. The process of claim 1, wherein said catalytic cracking zone is a riser reactor.

8. The process of claim 1, wherein said process is a fluid catalytic cracking process.

9. The process of claim 1, wherein the process is a thermofor catalytic cracking process.

10. The process of claim 1, wherein the heavy hydrocarbon feed is selected from the group consisting of gas oil and resid.

11. In a catalytic cracking process, undertaken in the presence of a cracking catalyst free of manganese, in a catalytic cracking zone, to upgrade a heavy hydrocarbon feedstock to produce gasoline, during which upgrade, coke formation on the catalyst occurs, wherein the catalyst containing said coke during cracking is conveyed to a regenerator for regeneration and, after regeneration, is reduced in coke content and is conveyed to said zone, the improvement comprising passing through said zone a heavy hydrocarbon feed; subjecting the feed to catalytic cracking conditions by passing to said zone a catalyst composition consisting essentially of manganese and ultrastable Y and a matrix component, wherein the manganese content ranges from 0.1 to 10 weight percent of the catalyst composition with a Na content which is less than 0.5 weight percent, wherein catalytic cracking conditions include a temperature of about 850° F. to about 1500° F., a catalyst to feed ratio of 1:1 to about 50:1; and whereby the weight of coke formed on said cracking catalyst composition is less than that formed on the cracking catalyst free of manganese.

12. The process of claim 11, wherein said less weight of coke formed is accompanied by increased gasoline yields.

13. In a fluid catalytic cracking process, undertaken in the presence of a cracking catalyst free of manganese, in a catalytic cracking zone, to upgrade a heavy hydrocarbon feedstock to produce gasoline, during which upgrade, coke formation on the catalyst occurs, wherein the catalyst containing said coke during cracking is conveyed to a regenerator for regeneration and, after regeneration, is reduced in coke content and is conveyed to said zone, the improvement comprising passing through said zone a heavy hydrocarbon feed; subjecting the feed to catalytic cracking conditions by passing to said zone a catalyst composition consisting essentially of rare earths, manganese and a large pore crystalline molecular sieve and a matrix component, wherein the manganese content ranges from 0.1 to 10 weight percent of the catalyst composition, wherein the rare earth content ranges from 0.1 to 10 weight percent, wherein catalytic cracking conditions include a temperature of about 850° F. to about 1500° F., a catalyst to feed ratio of 1:1 to about 50:1 and recovering upgraded effluent with gasoline yields greater than that of the cracking catalyst free of manganese.

14. The process of claim 13, which includes the further improvement of increasing the gasoline octane number, wherein the catalyst composition prepared by rare earth addition prior to manganese addition produces a higher gasoline octane than the catalyst composition prepared by either rare earth addition subsequent to manganese addition or co-addition of rare earth and manganese.

15. The process of claim 13, wherein at least a portion of said manganese and rare earths are exchanged onto the catalyst composition.

16. The process of claim 13, wherein at least part of said manganese and rare earths are deposited on said catalyst composition.

17. The process of claim 13, wherein said catalyst composition is ammonium ion exchanged and then calcined.

18. The process of claim 13, wherein the composite catalyst composition comprises 1 to 99 weight percent of a matrix.

19. The process of claim 13, wherein the large pore crystalline molecular sieve is USY.

20. The process of claim 13, wherein the catalytic cracking process is undertaken in the absence of added hydrogen.

21. The process of claim 13, wherein said catalytic cracking zone is a riser reactor.

22. The process of claim 13, which is a fluid catalytic cracking process.

23. The process of claim 13, wherein the process is a thermofor catalytic cracking process.

24. The process of claim 13, wherein the heavy hydrocarbon feed is selected from the group consisting of gas oil and resid.

25. In a catalytic cracking process, undertaken in the presence of a cracking catalyst free of manganese, in a catalytic cracking zone, to upgrade a heavy hydrocarbon feedstock to produce gasoline, during which upgrade, coke formation on the catalyst occurs, wherein the catalyst containing said coke during cracking is conveyed to a regenerator for regeneration and, after regeneration, is reduced in coke content and is conveyed to said zone, the improvement comprising passing through said zone a heavy hydrocarbon feed; subjecting the feed to catalytic cracking conditions by passing to said zone a catalyst composition consisting essentially of rare earths, manganese and a large pore crystalline molecular sieve and a matrix component, wherein the manganese content ranges from 0.1 to 10 weight percent of the catalyst composition, wherein the rare earth content ranges from 0.1 to 10 weight percent, wherein catalytic cracking conditions include a temperature of about 850° F. to about 1500° F., a catalyst to feed ratio of 1:1 to about 50:1; and whereby the weight of coke formed on said cracking catalyst composition is less than that formed on the cracking catalyst free of manganese.

26. The process of claim 25, wherein the catalyst composition is prepared by rare earth metal addition prior to manganese addition.

27. The process of claim 25, wherein said less weight of coke formed is accompanied by increased gasoline yields.

28. The process of claim 26, wherein said less weight of coke formed is accompanied by increased gasoline yields.

29. The process of claim 25, wherein said large pore crystalline molecular sieve is ultrastable Y.

30. The process of claim 26, wherein said large pore crystalline molecular sieve is ultrastable Y.

31. The process of claim 27, wherein said large pore crystalline molecular sieve is ultrastable Y.

32. The process of claim 28, wherein said large pore crystalline molecular sieve is ultrastable Y.

33. In a catalytic cracking process, undertaken in the presence of a cracking catalyst free of manganese, in a catalytic cracking zone, to upgrade a heavy hydrocarbon feedstock to produce gasoline, during which upgrade, coke formation on the catalyst occurs, wherein the catalyst containing said coke during cracking is conveyed to a regenerator for regeneration and, after regeneration, is reduced in coke content and is conveyed to said zone, the improvement comprising passing through said zone a heavy hydrocarbon feed, subjecting the feed to catalytic cracking conditions by passing to said zone a catalyst composition consisting essentially of manganese; ultrastable Y; a matrix component; and a shape selective zeolite selected from the group consisting of ZSM-5, ZSM-11, ZSM-12, ZSM-23, ZSM-35, ZSM-48 and ZSM-57; wherein the manganese content ranges from 0.1 to 10 weight percent of the catalyst composition with a Na content which is less than 0.5 weight percent, wherein catalyst cracking conditions include a temperature of about 850° F. to about 1500° F., a catalyst to feed ratio of 1:1 to about 50:1; and recovering upgraded effluent with gasoline yields greater than that of the cracking catalyst free of manganese.

34. In a catalytic cracking process, undertaken in the presence of a cracking catalyst free of manganese, in a catalytic cracking zone, to upgrade a heavy hydrocarbon feedstock to produce gasoline, during which upgrade, coke formation on the catalyst occurs, wherein the catalyst containing said coke during cracking is conveyed to a regenerator for regeneration and, after regeneration, is reduced in coke content and is conveyed to said zone, the improvement comprising passing through said zone a heavy hydrocarbon feed, subjecting the feed to catalytic cracking conditions by passing to zone a catalyst composition consisting essentially of manganese, ultrastable Y, a matrix component, and 0.1 to 100 parts per million of an oxidation promoter wherein said oxidation promoter is selected from the group consisting of platinum, palladium, iridium, osmium, rhodium, ruthenium, rhenium and mixtures thereof; wherein the manganese content ranges from 0.1 to 10 weight percent of the catalyst composition with a Na content which is less than 0.5 weight percent, wherein catalytic cracking conditions include a temperature of about 850° F. to about 1500° F., a catalyst to feed ratio of 1:1 to about 50:1; and recovering upgraded effluent with gasoline yields greater than that of the cracking catalyst free of manganese.

35. In a catalytic cracking process, undertaken in the presence of a cracking catalyst free of manganese, in a catalytic cracking zone, to upgrade a heavy hydrocarbon feedstock to produce gasoline, during which upgrade, coke formation on the catalyst occurs, wherein the catalyst containing said coke during cracking is conveyed to a regenerator for regeneration and, after regeneration, is reduced in coke content and is conveyed to said zone, the improvement comprising passing through said zone a heavy hydrocarbon feed, subjecting the feed to catalytic cracking conditions by passing to said zone a catalyst composition consisting essentially of rare earths, manganese, a large pore molecular sieve, a matrix component, and a shape selective zeolite selected from the group consisting of ZSM-5, ZSM-11, ZSM-12, ZSM-23, ZSM-35, ZSM-48 and ZSM-57; wherein the manganese content ranges from 0.1 to 10 weight percent of the catalyst composition with a Na content which is less than 0.5 weight percent, wherein the rare earth content ranges from 0.1 to 10 weight percent wherein catalytic cracking conditions include a temperature of about 850° F. to about 1500° F., a catalyst to feed ratio of 1:1 to about 50:1; and recovering upgraded effluent with gasoline yields greater than that of the cracking catalyst free of manganese.

36. In a catalytic cracking process, undertaken in the presence of a cracking catalyst free of manganese, in a catalytic cracking zone, to upgrade a heavy hydrocarbon feedstock to produce gasoline, during which upgrade, coke formation on the catalyst occurs, wherein the catalyst containing said coke during cracking is conveyed to a regenerator for regeneration and, after regeneration, is reduced in coke content and is conveyed to said zone, the improvement comprising passing through said zone a heavy hydrocarbon feed, subjecting the feed to catalytic cracking conditions by passing to said zone a catalyst composition consisting essentially of rare earths, manganese, a large pore molecular sieve, and a matrix component, and 0.1 to 100 parts per million of an oxidation promoter wherein said oxidation promoter is selected from the group consisting of platinum, palladium, iridium, osium, rhodium, ruthenium, rhenium and mixtures thereof;

wherein the manganese content ranges from 0.1 to 10 weight percent of the catalyst composition with a Na content which is less than 0.5 weight percent, wherein the rare earth content ranges from 0.1 to 10 weight percent wherein catalytic cracking conditions include a temperature of about 850° F. to about 1500° F., a catalyst to feed ratio of 1:1 to about 50:1; and recovering upgraded effluent with gasoline yields greater than that of the cracking catalyst free of manganese.

* * * * *